United States Patent [19]

Yamakawa et al.

[11] Patent Number: 4,516,025

[45] Date of Patent: May 7, 1985

[54] METHOD AND APPARATUS FOR CONTROLLING SCINTILLATION CAMERA

[75] Inventors: Tsutomu Yamakawa, Otawara; Mineki Nishikawa, Tochigi; Tomohiko Kihara, Otawara, all of Japan

[73] Assignee: Tokyo Shibaura Denki Kabushiki Kaisha, Kawasaki, Japan

[21] Appl. No.: 304,874

[22] Filed: Sep. 23, 1981

[30] Foreign Application Priority Data

Sep. 26, 1980 [JP] Japan .................. 55-134084

[51] Int. Cl.³ .............................. G01T 1/20
[52] U.S. Cl. .................. 250/252.1; 250/363 S; 250/369
[58] Field of Search ............. 250/252.1, 369, 363 S, 250/366, 363 R, 207; 364/571, 414; 307/268, 475, 490

[56] References Cited

U.S. PATENT DOCUMENTS

| | | | |
|---|---|---|---|
| 3,487,222 | 12/1969 | Martens | 250/207 |
| 3,515,878 | 6/1970 | Ried, Jr. et al. | 250/207 |
| 3,745,345 | 7/1973 | Muehllehner | |
| 3,922,541 | 11/1975 | Seeman | 250/363 R |
| 3,953,735 | 4/1976 | Stout | 250/363 S |
| 3,959,666 | 5/1976 | Fett et al. | 307/475 |
| 4,035,651 | 7/1977 | LeMay | 364/414 |
| 4,079,257 | 3/1978 | Jatteau et al. | 250/363 S |
| 4,093,857 | 6/1978 | Lapidus | 250/369 |
| 4,142,102 | 2/1979 | Lange | 250/369 |
| 4,323,977 | 4/1982 | Arseneau | 250/363 S |

FOREIGN PATENT DOCUMENTS 54-36757  3/1979  Japan ........................... 250/207

OTHER PUBLICATIONS

Baldin, "Highly Sensitive Shapers of Photomultiplier Signals", Instrum. & Exp. Tech., 23 (5), Apr. 1981, (Translated from Pribory; Tek. Eksp. No. 5, pp. 137-141, Sep./Oct. 1980), pp. 1202-1207.

*Primary Examiner*—Janice A. Howell
*Assistant Examiner*—Carolyn Fields
*Attorney, Agent, or Firm*—Cushman, Darby & Cushman

[57] ABSTRACT

A method for controlling a scintillation camera has a step of, under the control of a CPU, displacing a radiation source displacing device to which is fixed a radiation source and obtaining a center of sensitivity of a photomultiplier tube to be measured. After the center of sensitivity including the effects of the waveform shaping circuit is obtained, the radiation source is displaced in a plurality of directions relative to the center of sensitivity under the control of the CPU, so as to obtain an average photomultiplier tube response (PMT response) as a function of distance from the center of sensitivity of the photomultiplier tube. The CPU compares the obtained average PMT response with a reference PMT response which provides an image of optimal uniformity to obtain data by which the average PMT response approaches the reference PMT response. Based on this data, the CPU obtains parameters of the waveform shaping circuit to provide a response close to the reference PMT response.

5 Claims, 17 Drawing Figures

F I G. 11A
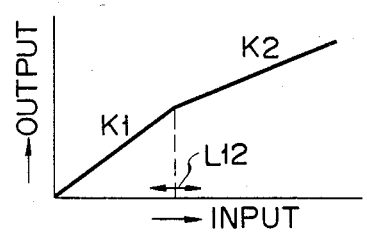
F I G. 11B
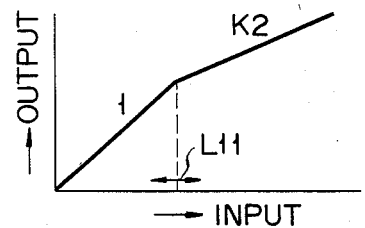
F I G. 11C
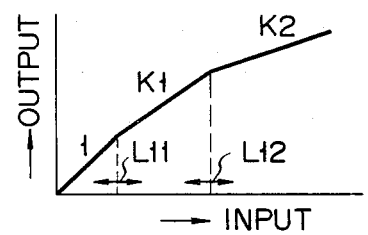
F I G. 12A
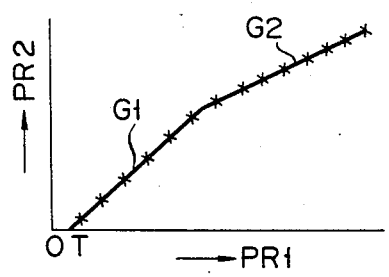
F I G. 12B
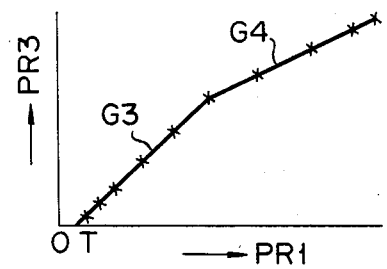

METHOD AND APPARATUS FOR CONTROLLING SCINTILLATION CAMERA

BACKGROUND OF THE INVENTION

The present invention relates to a method and an apparatus for controlling a scintillation camera and, more particularly, to a method and an apparatus for effectively controlling the field uniformity of a scintillation camera with efficiency and precision.

A scintillation camera is used for detecting radiation (usually gamma rays) emitted by a body to whom small amounts of radioisotopes have been administered. The radiation emitted by the tissue of the body under examination is guided to a scintillator by a collimator in such a manner that the point of the body emitting the radiation coincides with the point at which the radiation is absorbed by the scintillator.

The scintillator absorbs the radiation to cause scintillation and to convert the radiation into visible light. A plurality of photomultiplier tubes are optically coupled to the scintillator to convert the visible light into electric signals. These electric signals are supplied to a position calculating circuit through a waveform shaping circuit. The position calculating circuit calculates the X- and Y-coordinates of the point of the body emitting the radiation and supplies X- and Y-coordinate signals obtained to a cathode ray tube. Based on the X- and Y-coordinates thus supplied and an unblanking signal, the cathode ray tube screen displays the distribution of the radioisotopes present in the tissue of the body under examination.

In general, in a scintillation camera adopting a resistor matrix for the position calculating circuit, radiation detection pulse signals supplied from the photomultiplier tubes are subjected to a nonlinearity correction at the waveform shaping circuit to correct the field nonuniformity of the display on the cathode ray tube. However, due to variations in the characteristics of the optical system of the radiation detector including the scintillator and so on, the responses of the photomultiplier tubes (to be referred to as PMT responses hereinafter) included in this optical system vary to a non-negligible extent. Therefore, the parameters of the nonlinearity of the waveform shaping circuit must be changed for the output of each photomultiplier tube. However, since this method takes a very long time, actually the nonlinearity parameters of the waveform shaping circuit are obtained according to the output of a representative photomultiplier tube selected.

The parameters of the respective waveform shaping circuits have conventionally been determined by obtaining the PMT responses in the following manner. FIG. 1 shows a conventional method for collecting the PMT responses.

A photomultiplier tube 10 is arranged in the vicinity of a scintillator 14 through a light guide 12 for receiving radiation from the scintillator 14. A point source of radiation PS such as $^{57}$Co is manually moved over the surface of the scintillator 14. The output end of the photomultiplier tube 10 is connected through a cable 15 to the input end of a waveform shaping circuit 18 which performs the waveform shaping and the nonlinearity correction and which constitutes part of an analyzer unit 16. Although only one photomultiplier tube 10 and waveform shaping circuit 18 are shown in the figure, they are the same in number as the number of channels. The output of the waveform shaping circuit 18 is usually input to a position calculating circuit of the resistor matrix type. However, it is input to a multi-channel analyzer 20 here to obtain the PMT responses. FIG. 1 shows a case wherein the PMT responses are obtained by a system including the photomultiplier tube 10, the waveform shaping circuit 18, and the optical system. The point source of radiation PS of $^{57}$Co is placed on the surface of the scintillator 14 at the center of sensitivity of the photomultiplier tube 10. The multi-channel analyzer 20 records the peak value of the channel of the waveform at which the scintillations are most frequently received. Thereafter, the point source of radiation PS is sequentially displaced from the center of sensitivity and the same procedure is repeated. FIG. 2 is a characteristic curve obtained in this manner, which represents the PMT responses. Therefore, the PMT response is the distribution characteristic f(x) of the sensitivity as a function of distance x from the center of sensitivity of the photomultiplier tube 10.

A nonlinear circuit incorporated in the waveform shaping circuit 18 is of the circuit configuration as shown in FIG. 3. An input terminal IT1 is connected to the base of a transistor Tr1 through a resistor R1. A voltage of +15 V is applied to the collector of the transistor Tr1, and a voltage of −15 V is applied to the emitter of the transistor Tr1 through a resistor R2. Connected in parallel to the base of the transistor Tr1 are a series circuit of a diode D1 and a resistor R3, and a series circuit of a diode D2 and a resistor R4. An output terminal OT1 is connected to the emitter of the transistor Tr1. The nonlinear circuit is a polygonal line nonlinear circuit wherein the point of discontinuity of the polygonal nonlinear characteristic curve is determined by reference voltages L1 and L2 supplied to the resistors R3 and R4, respectively, of the series circuits described above.

The parameters of the resistors R3 and R4 of this nonlinear circuit are experimentally determined based on the PMT responses under conditions where the nonlinearity correction is not effected with L1 and L2 being large. After the parameters of the circuit are determined in this manner, the reference voltages L1 and L2 are varied, and photographs of the CRT display are taken according to the respective combinations of the reference voltages L1 and L2. These photographs are arranged in the manner as shown in FIG. 4.

FIG. 4 shows the photographs taken according to various combinations of the reference voltages L1 and L2 for examining the uniformity of the image wherein the reference voltage L1 is plotted along the abscissa and the reference voltage L2 is plotted along the ordinate. The group of photographs for examining the uniformity will hereinafter be called a map. Since the region where L1<L2 corresponds to the region wherein L1>L2 except that L1 and L2 are interchanged, the description will only be made with reference to the region wherein L1≦L2. Positions in the same neighborhood of the map thus obtained are under similar conditions and show similar uniformity characteristics. Therefore, the reference voltages L1 and L2 with which excellent uniformity is obtained may be readily determined from the good or poor uniformity distribution on the map. The uniformity control is thus completed by setting the reference voltages L1 and L2 at values at which the uniformity is optimum.

However, such a control method has certain drawbacks which are described below:

(1) Since the point source of radiation PS is manually moved, the precision in setting the position poses a problem.

(2) Since the measurement of the PMT responses are performed manually, a relatively lengthy amount of time is required for the measurement.

(3) Since the parameters for the nonlinear correction are experimentally determined, the resultant parameters are not stable and the uniformity condition varies from one scintillation camera to another.

(4) The standards for setting the reference voltages L1 and L2 for obtaining the optimum uniformity in the map are not established.

SUMMARY OF THE INVENTION

It is an object of the present invention to provide a method and apparatus for controlling the uniformity of the scintillation camera with efficiency and precision.

The object has been attained according to the present invention by a method for controlling a scintillation camera, said scintillation camera having a scintillator for converting radiation emitted from radioisotopes in a body into light, photomultiplier tubes for converting the light input through the scintillator and a light guide into electric signals, waveform shaping circuits containing a nonlinearity correction circuit for shaping the waveforms of and nonlinearly correcting signals output from the photomultipliers, a position calculating circuit which calculates the position from which the radiation is emitted according to signals output from the waveform shaping circuits and which produces a position signal and an unblanking signal, and a cathode ray tube which displays the position from which the radiation is emitted according to the position signal and the unblanking signal, comprising the steps of:

supplying a control signal to a radiation source displacing device from a central processing unit (CPU) to displace a radiation source fixed to the radiation source displacing device along the surface of the scintillator relative to a photomultiplier tube to be measured, inputting a signal obtained from the photomultiplier tube into a multi-channel analyzer through a waveform shaping device including a circuit identical to the waveform shaping circuit to obtain the peak channel value of the signal, and supplying another control signal to the radiation source displacing device from the CPU according to the peak value to displace the radiation source, thereby obtaining the center of sensitivity of the photomultiplier tube;

supplying another control signal to the radiation source displacing device from the CPU to displace the radiation source in a plurality of directions along the surface of the scintillator and relative to the center of sensitivity of the photomultiplier tube, inputting the signals output from the photomultiplier tube to the multi-channel analyzer through the waveform shaping device whose nonlinearity correction circuit is set not to operate to obtain the peak channel values which are sequentially supplied to the CPU, and obtaining by the CPU an average photomultiplier tube response as a function of the distance from the center of sensitivity according to the peak channel values; and comparing, at the CPU, the average photomultiplier tube response with a reference photomultiplier tube response for providing an image of optimum uniformity which is stored in advance, obtaining a value for making the average photomultiplier tube response close to the reference photomultiplier tube response, and obtaining, according to the value obtained, parameters of the nonlinearity correction circuit which provides a photomultiplier tube response close to the reference photomultiplier tube response.

According to the present invention, the central processing unit (CPU) drives and controls a radiation source displacing device to which is fixed a point source of radiation to obtain the response and the center of sensitivity of a photomultiplier tube to be measured. Based on the obtained photomultiplier response and a reference photomultiplier tube response for providing a satisfactory uniform image which is stored in advance, the parameters of the waveform shaping circuit is so determined that the response of the photomultiplier tube to be measured comes close to the reference photomultiplier tube response. Therefore, uniformity of the scintillation camera may be controlled with efficiency and precision.

BRIEF DESCRIPTION OF THE DRAWINGS

By way of example and to make the description clearer, reference is made to the accompanying drawings in which:

FIGS. 11A to 11C are graphs showing the characteristics of the nonlinearity correction device 38 at the respective regions shown in FIG. 10; and FIGS. 12A and 12B are graphs showing a PMT response of a photomultiplier tube to be measured and a reference PMT response, taking the distance from the center of sensitivity as a parameter.

DETAILED DESCRIPTION OF THE PREFERRED EMBODIMENT

Figure 1:
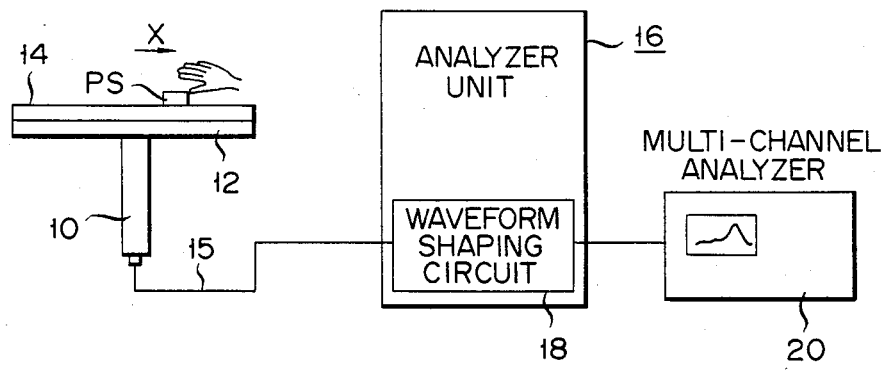
FIG. 1 is a view for explaining a conventional system for obtaining photomultiplier tube responses (PMT responses)
Figure 2:
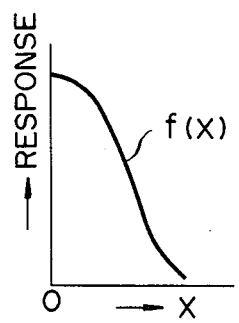
FIG. 2 is a view showing the PMT responses obtained by the system shown in FIG. 1.
Figure 3:
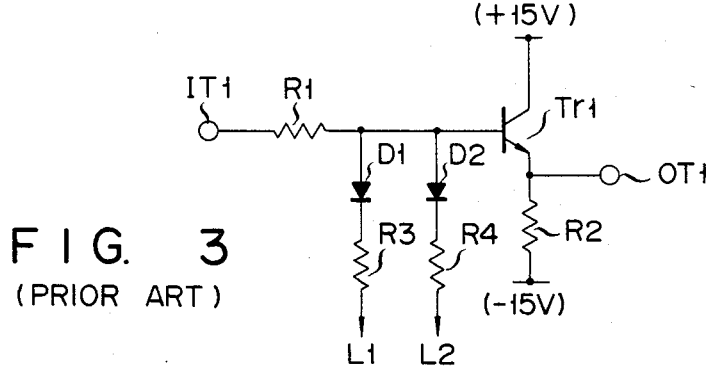
FIG. 3 is a circuit diagram of a nonlinear circuit incorporated in a waveform shaping circuit 18 shown in FIG. 1.
Figure 4:
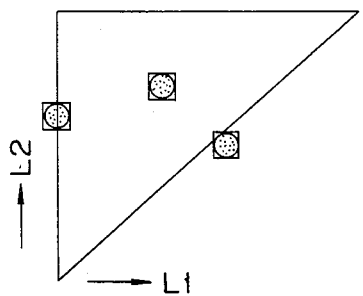
FIG. 4 is a view showing a uniformity image map obtained by changing L1 and L2 after the determining of R3 and R4 in FIG. 3.
Figure 5:
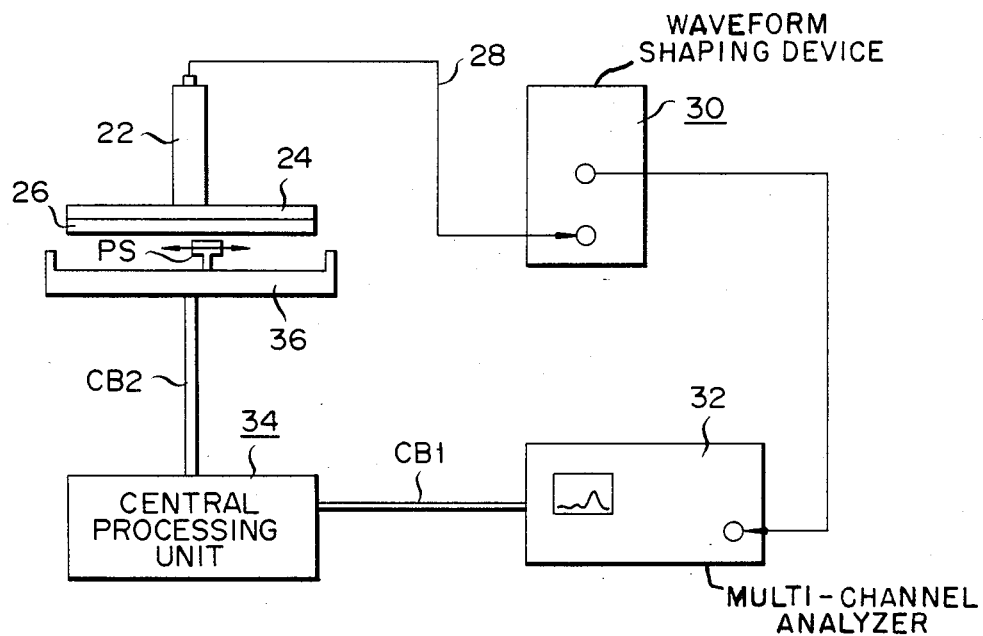
FIG. 5 is a block diagram showing the configuration of an embodiment of a scintillation camera control apparatus according to the present invention.

FIG. 5 schematically shows an embodiment of the scintillation camera control apparatus according to the present invention.

A photomultiplier tube 22 is arranged in the vicinity of a scintillator 26 through a light guide 24 to receive radiation emitted from the scintillator 26. Although not shown in the figure, other photomultiplier tubes are also arranged in parallel with the photomultiplier tube 22 and along the surface of the light guide 24. The output end of the photomultiplier 22 is connected to the input end of a waveform shaping device 30 through a cable 28. The waveform shaping device 30 comprises a circuit which is similar to the waveform shaping circuit of the scintillation camera, and a circuit which is capable of selectively setting the respective parameters of the nonlinearity correction device of this circuit. The output end of the waveform shaping device 30 is connected to the input end of a multi-channel analyzer 32 (to be referred to as MCA for brevity hereinafter). The MCA 32 serves to perform energy analysis of the radiation detection pulse signals received through the waveform shaping device 30. The output end of the MCA 32 is connected to a central processing unit 34 (to be referred to as a CPU for brevity hereinafter) through a control bus CB1 for exchange of data and control signals with the CPU 34 through this control bus CB1. The CPU 34 is also connected to a radiation source displacing device 36 through a control bus CB2 for exchange of data and control signals with the radiation source displacing device 36 through this control bus CB2. The radiation source displacing device 36 may comprise, for example, an X-Y plotter. The point source of radiation PS (e.g., a radiation source package of $^{57}Co$ or the like) is fixed to the movable part of the radiation source displacing device 36 so that it may be movable longitudinally and transversely along the surface of the scintillator 26. When the X-Y plotter is used as the radiation source displacing device 36, the point source of radiation PS is fixed to the needle of the X-Y plotter.

Figure 6:
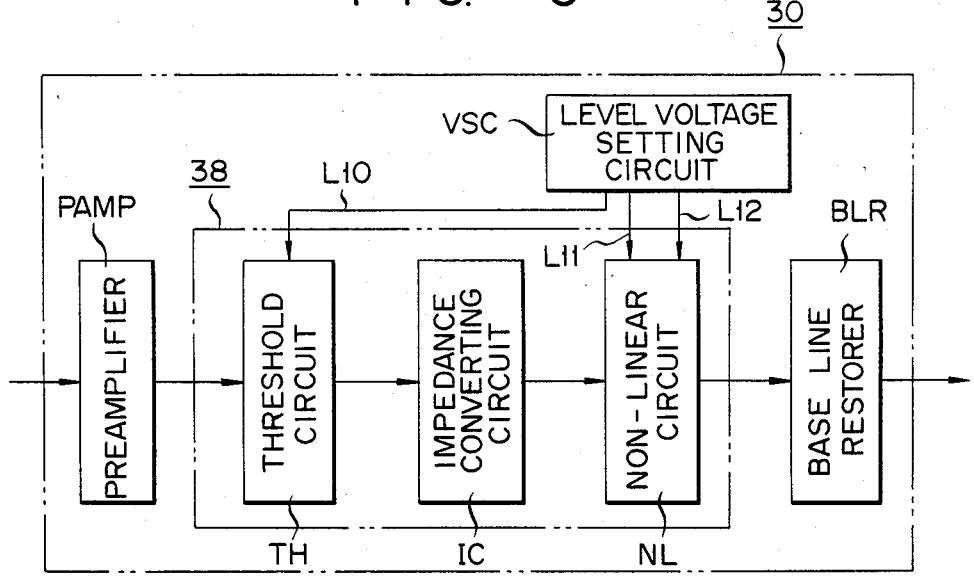
FIG. 6 is a block diagram schematically showing the configuration of a waveform shaping device 30 shown in FIG. 5.

FIG. 6 is a block diagram showing the schematic configuration of the waveform shaping device 30. A preamplifier PAMP amplifies a signal output from the photomultiplier tube 22. A threshold circuit TH connected to the preamplifier PAMP removes the noise components from this signal. An impedance converting circuit ICN connected to this threshold circuit TH separates the threshold circuit TH from the nonlinear circuit of the next stage so that they may not affect each other in terms of impedance. A nonlinear circuit NL connected to this impedance converting circuit ICN is an amplifying circuit having polygonal nonlinear characteristics. A base line restorer BLR connected to the nonlinear circuit NL restores the base line level of the signal output from the nonlinear circuit NL to zero level. A voltage level setting circuit VSC supplies reference voltages L10, L11 and L12 to the threshold circuit TH and the nonlinear circuit NL. The threshold circuit TH, the impedance converting circuit ICN, and the nonlinear circuit NL comprise a nonlinearity correction device 38.

Figure 7:
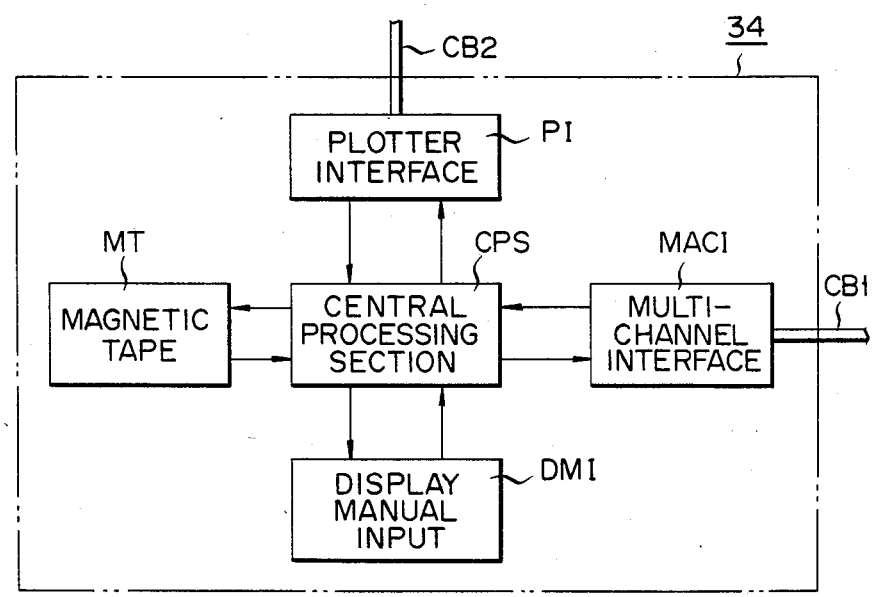
FIG. 7 is a block diagram schematically showing the configuration of a central processing unit (CPU) 34 shown in FIG. 5.

FIG. 7 is a schematic diagram of the CPU 34. A multi-channel interface MACI is connected to the MCA 32 through the control bus CB1. The exchange of data and control signals between a central processing section CPS and the MCA 32 is performed through this multichannel interface MACI. A display/manual input section DMI is used for display or input of data. A magnetic tape device MT stores the data supplied from the MCA 32 and other necessary data. In response to a command from the central processing section CPS, a plotter interface PI sends a control signal to the radiation source displacing device 36 through the control bus CB2 and also converts a signal supplied from the radiation source displacing device 36 into a signal which may be read by the central processing section CPS. The plotter interface PI then sends this converted signal to the central processing section CPS. Based on the PMT response thus obtained, the central processing section CPS performs various calculations for obtaining the parameters of the nonlinear circuit NL and exchanges data with the multi-channel interface MACI, the display/manual input section DMI, the magnetic tape device MT, and the plotter interface PI.

Figure 8:
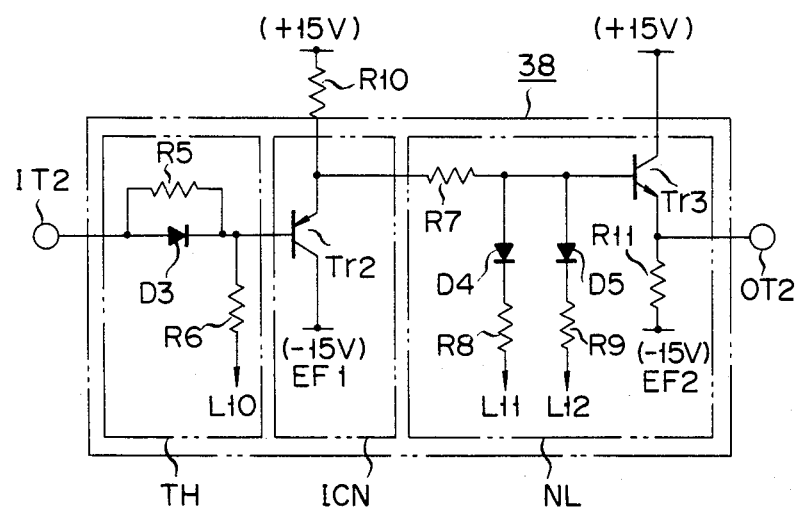
FIG. 8 is a circuit diagram showing a nonlinearity correction device 38 shown in FIG. 6.

FIG. 8 is a circuit diagram of the nonlinear correction device 38. An input terminal IT2 of the nonlinear correction device 38 is connected to the base of a transistor Tr2 through a parallel circuit of a resistor R5 and a diode D3. The reference voltage L10 is applied to the base of the transistor Tr2 through a resistor R6. The resistors R5 and R6 and the diode D3 constitute the threshold circuit TH. The threshold level of this threshold circuit TH is determined by the reference voltage L10 supplied to the resistor R6. A voltage of +15 V is applied to the emitter of the transistor Tr2 through a resistor R10, and a voltage of −15 V is directly applied to the collector of the transistor Tr2. The emitter of the transistor Tr2 is connected to the base of a transistor Tr3 through a resistor R7. The transistor Tr2 and the resistor R10 constitute the impedance converting circuit ICN. Connected in parallel to the base of the transistor Tr3 are a series circuit of a diode D4 and a resistor R8, and a series circuit of a diode D5 and a resistor R9. The reference voltages L11 and L12 are applied to these respective series circuits. A voltage of +15 V is applied to the collector of the transistor Tr3, and a voltage of −15 V is applied to the emitter of the transistor Tr3 through a resistor R11. An output terminal OT2 is connected to the emitter of the transistor Tr3. The transistor Tr3, the resistors R7, R8, R9 and R11, and the diodes D4 and D5 constitute the nonlinear circuit NL. The response of the nonlinear circuit NL may be approximated by a curve consisting of linear segments, to be called a polygonal line. The point of discontinuity in the gradient of the polygonal line is determined by the reference voltage L11 supplied to the series circuit of the diode D4 and the resistor R8, and by the reference voltage L12 supplied to the series circuit of the diode D5 and the resistor R9. The gradient of the polygonal line is determined by the resistances of the resistors R8 and R9. The transistor Tr2 is used as a first emitter follower circuit EF1, and the transistor Tr3 is used as a second emitter follower circuit EF2.

Figure 9A:
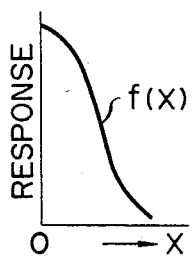
FIG. 9A is a graph showing the PMT response at an output terminal OT2 shown in FIG. 8, with L10, L11 and L12 being so large as not to effect nonlinear correction.
Figure 9B:
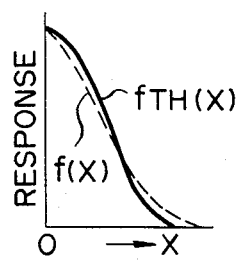
FIG. 9B is a graph showing the PMT response at the output terminal OT2 in FIG. 8, with L11 and L12 being so large that only L11 operates.
Figure 9C:
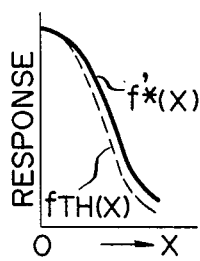
FIG. 9C is a graph showing the PMT response at the output terminal OT2 in FIG. 8, with L10, L11 and L12 all in operation.

The nonlinearity correction of the nonlinearity correction device 38 shown in FIG. 8 will now be described. FIG. 9A shows the original PMT response f(x) which is the PMT response at the output terminal OT2 of the nonlinear correction device 38 with L10, L11 and L12 so large as not to effect nonlinearity correction. The PMT response obtained by passing the signal of FIG. 9A through the threshold circuit TH is given by fTH(x) shown in FIG. 9B and the function defining the threshold processing is given by TH(x). The PMT response at the output terminal OT2 with L10, L11 and L12 all in operation, is f'*(x) shown in FIG. 9C wherein N(x) is a function defining the nonlinear processing. The responses shown in FIGS. 9A to 9C are all normalized. The reference voltages L10, L11 and L12 and the resistances of the resistors R8 and R9 of the circuit shown in FIG. 8 are set so that f'*(x) approaches the reference PMT response f*(x) by the method to be described below. The PMT response f*(x) as the reference of this method is the PMT response of the circuit including the threshold circuit TH, the impedance converting circuit ICN, and the nonlinear circuit NL, with which the uniformity is optimal among the uniform images obtained by the cut-and-try method.

In the nonlinearity correction device 38 shown in FIG. 8, an emitter follower circuit is inserted between the threshold circuit TH and the nonlinear circuit NL to separate these circuits. This makes easier the operation for making the map structure approach the reference map structure.

Figure 10:
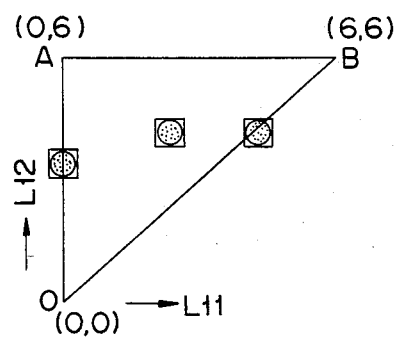
FIG. 10 is a view showing a uniformity image map obtained by changing the values of L11 and L12 with the values of R7, R8, and R9 fixed in FIG. 8.

The relationship between the map shown in FIG. 10 and the nonlinear correction will now be described. This map is considered within the range of L11≦L12. The resistances of the resistors R7, R8 and R9 of the nonlinear circuit NL are fixed for the same map. The map shown in FIG. 10 represents the case wherein 6 sets of coordinates were sampled in the direction of L11 and 6 sets of coordinates were sampled in the direction of L12. This map consists of 21 test photographs. The number of the test photographs constituting the map may be changed as needed.

FIG. 11A shows the nonlinear characteristics corresponding to the side OA of the map shown in FIG. 10. Under the conditions corresponding to the side OA of the map, the diode D4 of the nonlinear circuit NL shown in FIG. 8 is biased in the forward direction and the diode D5 is biased in the reverse direction in response to a signal smaller than the reference voltage L12. Therefore, the gradient K1 of the nonlinear characteristics may be given by equation (1) below:

$$K1 = R8/(R7+R8) \quad (1)$$

In response to a signal greater than the reference voltage L12, both the diodes D4 and D5 are biased in the forward direction. Therefore, the gradient K2 of the nonlinear characteristics in this case may be given by equation (2) below:

$$K2 = (R8//R9)/\{R7+(R8//R9)\} \quad (2)$$

where R8//R9 represents the parallel combined resistance of the resistors R8 and R9. With the change in the reference voltage L12, the position of the intersection (point of discontinuity in the gradients) of the line of the gradient K1 and the line of the gradient K2 as shown by arrow in the figure changes.

FIG. 11B shows the nonlinear characteristics corresponding to the side OB of the map shown in FIG. 10. On the side OB, L11=L12. Therefore, within the range greater than L11, both the diodes D4 and D5 are biased in the forward direction, so that the gradient of the nonlinear characteristics becomes K2. Therefore, the position of the point of discontinuity changes according to the change in the reference voltage L11.

FIG. 11C shows the nonlinear characteristics within the rectangle ΔOAB of the map shown in FIG. 10. Within the range wherein the input signal is smaller than the reference voltage L11, the gradient of the nonlinear characteristics is 1. Within the range wherein the input signal is greater than the reference voltage L11 and smaller than the reference voltage L12, the gradient of the nonlinear characteristics is K1. Within the range wherein the input signal is greater than the reference voltage L12, the gradient of the nonlinear characteristics is K2. The positions of the two points of discontinuity change with the changes in the reference voltages L11 and L12.

The parameter of the nonlinear circuit NL is determined by utilizing these map characteristics so that the map structure approaches the map structure (reference map) in which the uniformity test photographs are ideal.

If the emitter follower circuit EF1 is not inserted in the nonlinearity correction device 38 shown in FIG. 8, the threshold circuit TH and the nonlinear circuit NL are not separated in terms of impedance, forming an undesirable loop among the terminals to which the reference voltages L10, L11 and L12 are applied. Consequently, since the determination of the threshold level of the threshold circuit TH, which has the greatest effect on the uniformity of the image next to the nonlinear circuit NL, changes in association with the parameters of the nonlinear circuit NL, the setting of the parameters becomes very complex in procedure.

In this embodiment, the emitter follower circuit EF1 is inserted in the nonlinearity correction device 38 to solve this problem.

The procedure for determining the parameters will be described with reference to FIGS. 12A and 12B. With the reference map of the structure shown in FIG. 10, it is known from experiment that an image of satisfactory uniformity for another nonlinearity correction device may be obtained within the wide rectangle ΔOAB if the nonlinear characteristics of another nonlinearity correction device to be measured are made to resemble the nonlinear characteristics at the middle point of the side OB and the nonlinearity characteristics at the middle point of the side OA of the nonlinearity correction device 38. Therefore, the coordinates of FIGS. 12A and 12B are set as described below. In FIG. 12A, along the abscissa is plotted a PMT response PR1 obtained when the reference voltage L10 to determine the threshold level of the nonlinearity correction device 38 whose parameters are to be determined is 0 mV, and the reference voltages L11 and L12 for determining the turning point are pulled up. Along the ordinate is plotted a PMT response PR2 of the nonlinearity correction device which has provided the reference map as described above corresponding to the same distance x from the center of sensitivity, under the condition of L11 and L12 at the middle point of the side OB of the reference map of the structure shown in FIG. 10. Points marked with x represent the corresponding points. In FIG. 12B, along the abscissa is plotted the PMT response PR1 of the nonlinearity correction device 38 whose parameters are to be determined (under the same condition as in FIG. 12A), and along the ordinate is plotted a PMT response PR3 of the nonlinearity correction device which has provided the reference map corresponding to the same distance x, under the condition of L11 and L12 at the middle point of the side OA of the reference map. In these figures, T is determined by the voltage which determines the threshold level.

FIG. 12A shows the polygonal line characteristics consisting of gradient G1 and gradient G2, which correspond to the nonlinear characteristics of FIG. 11B.

Since G1/G2=K2/1, $$K2 = G2/G1 \qquad (3)$$

Thus, K2 may be determined from G1 and G2 shown in FIG. 12A.

FIG. 12B shows the polygonal line characteristics consisting of gradient G3 and gradient G4, which correspond to the nonlinear characteristics of FIG. 11A.

Since G4/G3=K2/K1, $$K1 = K2 \cdot G3/G4 \qquad (4)$$

Thus, K1 may be determined from G3, G4 and K2 shown in FIG. 12B.

From equation (1), we obtain $$R8 = (1-K1)/R7 \cdot K1 \qquad (5)$$

From equation (2), we obtain $$R9 = 1/\{(1-K2)R7 \cdot K1 - 1/R8\} \qquad (6)$$

where R7 is previously set. When K1 and K2 obtained in the manner described above are substituted in equations (5) and (6) above, the resistances of the resistors R8 and R9 which provide the image with optimal uniformity are obtained.

A change in the threshold level is equivalent to a horizontal displacement of the polygonal lines of FIGS. 12A and 12B. The reference voltage L10 is determined according to the voltage value corresponding to intersection T of the lines with the PMT response PR1 shown in FIGS. 12A and 12B, since such a voltage value corresponds to the threshold level to be applied.

The mode of operation of the embodiment shown in FIG. 5 will now be described. The center of sensitivity of the photomultiplier tube 22 is determined in the manner to be described below. A signal for determining the initial position is supplied to the radiation source displacing device 36 from the CPU 34 through the control bus CB2. Then, the initial position of the point source of radiation PS fixed to the radiation source displacing device 36 is determined. The output of the photomultiplier tube 22 at this instant is input to the waveform shaping device 30 through the cable 28. The output of the waveform shaping device 30 is input to the MCA 32. The MCA 32 stops collecting data at a preset count, and transfers the collected data to the CPU 34 through the control bus CB1. The CPU 34 detects the peak value of the channel of the output waveform (to be referred to as the peak channel value hereinafter) at which the signals are received most frequently among the transferred data, and sends a control signal according to the detected value through the control bus CB2 to displace the point source of radiation PS. The same procedure is repeated to search for the center of sensitivity, that is, the position at which the peak channel value is greatest. When the center of sensitivity is detected, this is displayed at the display section of the display/manual input section DM1 of the CPU 34.

After the detection of the center of sensitivity is completed, the PMT response is measured. Flow of data here is the same as that described with reference to the case of search for the center of sensitivity described above. The CPU 34 sends through the control bus CB2 to the radiation source displacing device 36 a control signal so that the point source of radiation PS advances in increments of 5 mm to the point 70 mm away from the center of sensitivity. The peak channel values detected by the central processing section CPS are sequentially stored in the magnetic tape device MT. When the data collection is completed, 70 mm in the X+ direction, the CPU 34 sends a control signal to the radiation source displacing device 36 through the control bus CB2, to return the point source of radiation PS to the center of sensitivity. Thereafter, the CPU 34 also sends a control signal to perform a similar operation in the X− direction. The CPU 34 sends control signals to the radiation source displacing device 36 through the control bus CB2 so that similar processing may be performed in the Y+ and Y− directions as well. After the central processing Section CPS completes collection of data in the X+, X−, Y+ and Y− directions within 70 mm from the center of sensitivity, calculates the average PMT response of each distance x from the center of sensitivity in the X+, X−, Y+ and Y− directions. The data obtained in this manner is the PMT response f(x) of the photomultiplier tube 22. When this PMT response f(x) is obtained, the central processing section CPS displays this at the display/manual input section DMI.

Subsequently, on the basis of the PMT response f*(x) as the reference stored in the magnetic tape device MT, PMT responses PR2 and PR3 for the reference map and equations (3) to (6), the central processing section CPS calculates the parameters (resistances of the resistors R8 and R9) of the nonlinear circuit NL and displays the obtained results at the display/manual input section DMI.

The waveform shaping circuit of the scintillation camera connected to the respective photomultiplier tube 22 through cables includes the nonlinearity correction device 38 shown in FIG. 8. The resistors having the same resistances as resistors R8 and R9 thus obtained are inserted to the corresponding places of the nonlinearity correction circuit of the waveform shaping circuit. With this control, the scintillation camera provides the optimal image.

The processing described above includes small portions of manual operation for setting the gain of the waveform shaping device 30, calibration of the MCA 32, and so on. However, this processing may be performed on line substantially with peripheral equipment control by the CPU 34. Accordingly, the measurement of the PMT response may be performed with efficiency and precision.

The present invention is not limited to the embodiment described above and various other modifications and changes may be made within the spirit and scope of the present invention.

What we claim is:

1. A scintillation camera control apparatus comprising:
    means for forming visible light from radiation emitted from radioisotopes in a body;
    means for converting the visible light from the radiation to electrical impulses including a two dimensional array of photomultiplier tubes which receive the visible light from common radiation and give electrical impulses as a result thereof, said photomultiplier tubes having their own response curve as a function of a distance from the center of sensitivity;
    means for determining said own response curve relative to predetermined apparent radiations so as to obtain a measured response curve for calibrating;

means for calibrating said measured response curve by correcting the electrical impulses from said converting means, said calibrating means including a threshold circuit for removing from the electrical impulses those signals having a level lower than a predetermined threshold level, said predetermined threshold level being controlled in response to energy levels of the electric impulses;

a nonlinear circuit having a parameter for nonlinearity correction, said parameter being controlled in response to the measured response curve; and a separating circuit connected between the threshold circuit and the nonlinear circuit, said separating circuit electrically separating the threshold circuit from the nonlinear circuit in such a manner that the control of both said predetermined threshold level of the threshold circuit and said parameter of the nonlinear circuit can be independently performed.

2. An apparatus according to claim 1, wherein said separating circuit comprises an emitter follower circuit.

3. A method for calibrating the nonlinearity of a scintillation camera, comprising the steps of:

forming visible light from a radiation source fixed to a radiation source displacing device, said displacing device being movable in a two dimensional plane;

exposing a photomultiplier tube to said visible light for generating electrical impulses;

determining the center of sensitivity of said photomultiplier tube by supplying a control signal to said displacing device, thereby displacing the radiation source along said two dimensional plane of said displacing device;

using a multichannel analyzer to measure the response of said photomultiplier tube as a function of distance from the center of sensitivity to provide a measured response curve of said photomultiplier tube;

comparing the measured response curve of said photomultiplier tube with a reference response curve for the multiplier tube so as to provide an image of optimum uniformity which is stored in advance;

generating a value for making the measured response curve of said photomultiplier tube close to the reference response curve;

selecting first a threshold level of a threshold circuit in response to the energy level of electrical impulses; and selecting secondly a parameter of a nonlinear circuit in response to said generated value, whereby the nonlinear circuit provides an output close to the reference response curve.

4. A method for calibrating a scintillation camera, according to claim 3, wherein said visible light forming step forms the visible light from said radiation source fixed to said displacing device in the form of an X-Y plotter.

5. A method for calibrating a scintillating camera according to claim 3, wherein said determining step further includes a step of generating said control signal by a central processing unit.

* * * * *